(No Model.)

F. W. FOSTER.
STEAM GENERATOR.

No. 262,392. Patented Aug. 8, 1882.

Witnesses.
h. D. C. Hulps
Henry Chadbourn

Inventor.
Frank W. Foster
by Adam Andrew
his atty.

N. PETERS. Photo-Lithographer, Washington, D. C.

United States Patent Office.

FRANK W. FOSTER, OF MALDEN, MASSACHUSETTS.

STEAM-GENERATOR.

SPECIFICATION forming part of Letters Patent No. 262,392, dated August 8, 1882.

Application filed May 22, 1882. (No model.)

*To all whom it may concern:*

Be it known that I, FRANK W. FOSTER, a citizen of the United States, residing at Malden, in the county of Middlesex and State of Massachusetts, have invented certain new and useful Improvements in Steam-Generators; and I do hereby declare that the same are fully described in the following specification and illustrated in the accompanying drawings.

This invention relates to improvements in steam-generators, and it is carried out as follows, reference being had to the accompanying drawings, on which—

Figure 1:
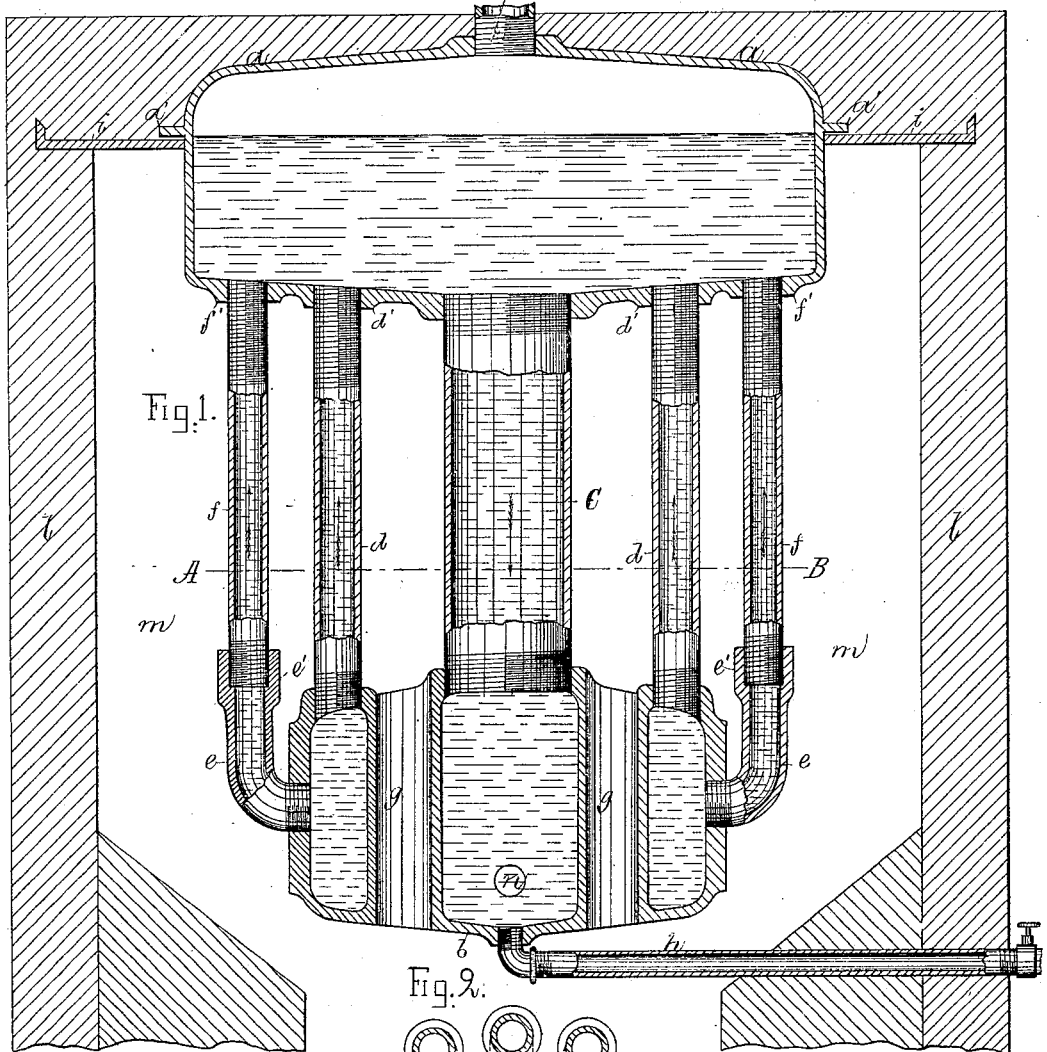
Figure 2:
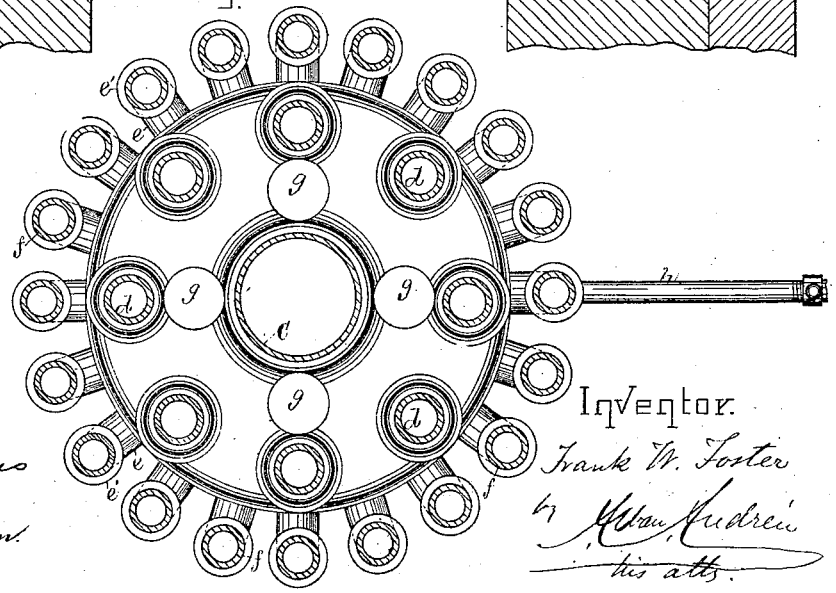

Figure 1 represents a central longitudinal section, and Fig. 2 represents a cross-section on the line A B, shown in Fig. 1.

Similar letters refer to similar parts wherever they occur on the different parts of the drawings.

This my improved steam-generator is constructed in such a manner as to obtain a very large heating-surface—that is, such part of it as is brought in direct contact with the live heat of the furnace—and also for the purpose of obtaining a constant circulation of the water within the generator, by which means the steam is generated in a very rapid manner. This my improved generator is so constructed that it may readily be taken apart for transportation or storage, to be packed away in a very small compass; and it is constructed with the view of allowing its component parts to expand and contract freely, according to variations in temperature in the furnace, without occasioning leaks or breakage.

In the drawings, $a$ represents the upper hollow cast-iron head, and $b$ represents the lower hollow cast-iron head, which heads are connected together by means of the central wrought-iron pipe, $c$, which is screwed in its upper and lower ends, respectively, to the hollow heads $a$ and $b$, as shown in Fig. 1. The upper and lower hollow cast-iron heads $a$ and $b$ are further connected together by means of a number of vertical smaller circulating-pipes, $d\,d\,d$, made of wrought-iron, screwed into screw-threaded perforations in the lower part of the hollow head $a$ and upper part of the hollow head $b$, as shown, and secured firmly in place by means of check-nuts $d'\,d'$ in their upper ends, as shown in Fig. 1. For the purpose of still further increasing the heating-surface of the generator, and to insure a more perfect circulation, I secure to the outer periphery of the lower hollow cast-iron head, $b$, and to screw-threaded perforations made therein, the elbow-pipes $e\,e$, having screw-threaded sockets $e'\,e'$ in their upper ends, by means of which they are connected to the vertical circulating-pipes $f\,f$, the upper ends of which are screwed into screw-threaded perforations in the under side of the upper hollow cast-iron head, $a$, and provided with check-nuts $f'\,f'$, as shown in Fig. 1. The direction of the circulation of the water in my improved generator when in use is indicated by the arrows in Fig. 1—that is, the lower-temperature water descends from the upper hollow cast-iron head, $a$, through the central pipe, $c$, into the lower hollow cast-iron head, $b$, and after being heated the water ascends from the lower hollow head, $b$, to the upper hollow head, $a$, through the smaller circulating-pipes $d\,d\,d$ and $e\,e$, and $f\,f$, as shown by the arrows in said Fig. 1.

$g\,g\,g\,g$ are heater-pipes, cast in one piece with the top and bottom of the lower hollow head, $b$, to allow the heated products from the furnace to pass through the lower hollow head, $b$, and thus to still further increase the heating-surface of the generator.

$h$ is the blow-off pipe, leading from the bottom of the lower hollow head, $b$, as usual; and $k$ is the live-steam-supply pipe, leading from the top of the upper hollow head, $a$, as shown.

$a'$ is an annular flange cast on the outside of the upper hollow head, $a$, which is adapted to rest on a cast-iron plate, $i$, embedded in the brick-work or masonry $l$, which incloses the fire-chamber $m$, as usual.

It will thus be seen that the greater portion of the generator is exposed to the live heat within the furnace or fire-chamber $m$, thus permitting the steam to be generated very rapidly.

$n$ is the cold-water feed-pipe, leading into the lower hollow head, $b$, as usual.

The pipes $c$, $d\,d$, $e\,e$, and $f\,f$, being of wrought-iron, permit of expansion and contraction to variations in the temperature without danger of leakage.

I am aware that it is old to provide in a steam-generator two hollow spheres connected by means of two vertical tubes, one within the other, with tubes radiating from the outer vertical tube in series, and having tubes contained therein and radiating from the inner central vertical tube, through which the water circulates; also, that it is old to provide in a steam-generator a series of horizontal water and steam chambers, set one above the other, with a casing or shell closely-fitting against their edges, and supported and connected by vertical and horizontal water-circulating tubes, the said chamber having vertical openings through them that serve as flues for the passage of the products of combustion. Such I do not claim as my invention; but What I wish to secure by Letters Patent and claim is—

In a steam-generator, the upper cast-iron head, $a$, and lower cast-iron head, $b$, the latter provided with flue-passages $g\,g$, the central connecting wrought-iron pipe, C, and vertical circulating wrought-iron pipes $d\,d$, $e\,e$, and $f\,f$, connecting said hollow heads $a$ and $b$, and blow-off pipe $h$, and feed-water pipe $n$, connected with the said head $b$, substantially as described.

In testimony whereof I have affixed my signature in presence of two witnesses.

FRANK W. FOSTER.

Witnesses:
ALBAN ANDRÉN,
HENRY CHADBOURN.